(No Model.) 7 Sheets—Sheet 3.
G. H. SPAULDING.
SELF BINDING HARVESTER.
No. 389,022. Patented Sept. 4, 1888.
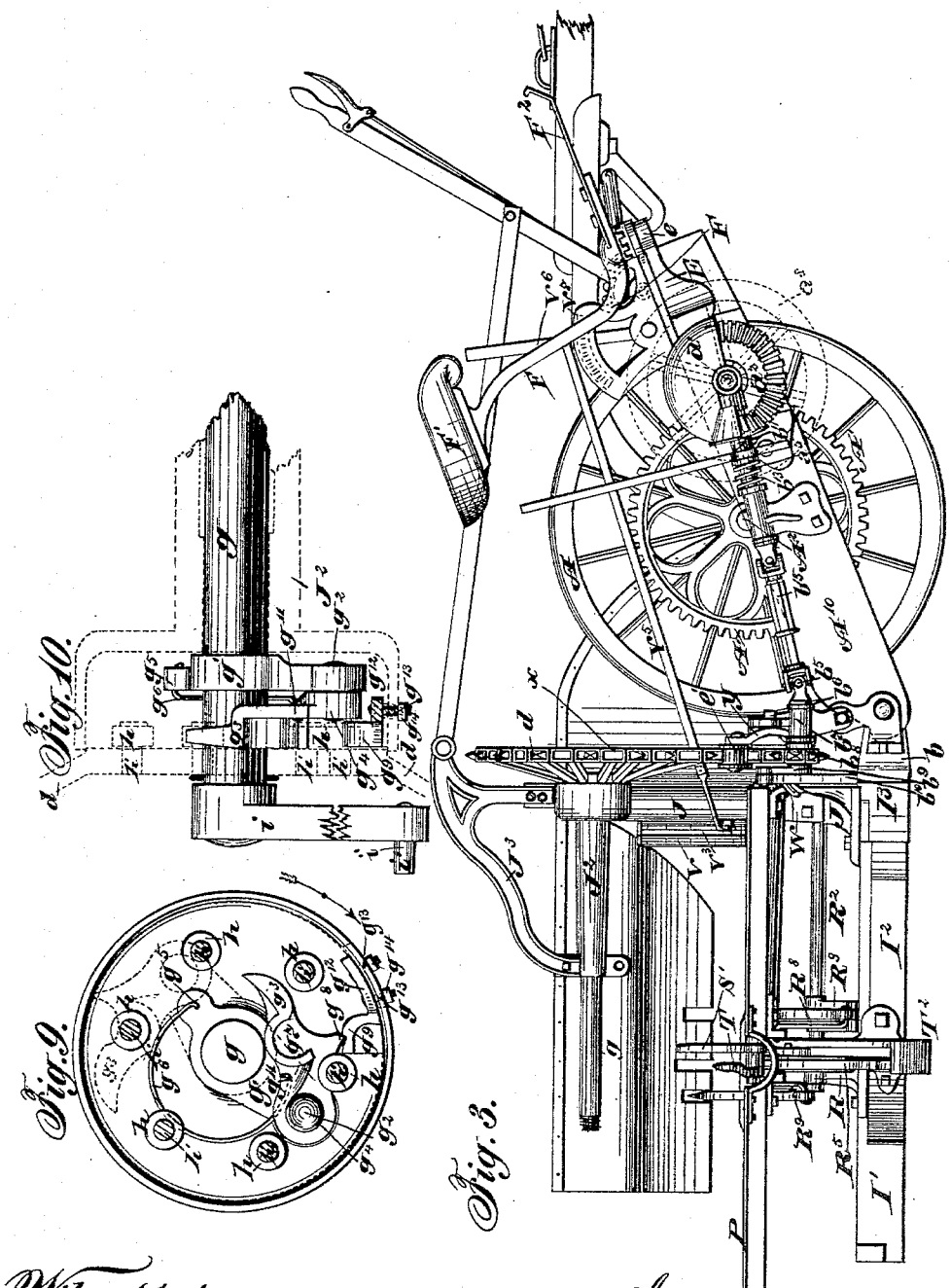
Witnesses:
John B. Kaspari
Laurence A. Bealing
Inventor:
George H. Spaulding
By J. F. Steward
His Atty (No Model.) 7 Sheets—Sheet 4.
G. H. SPAULDING.
SELF BINDING HARVESTER.
No. 389,022. Patented Sept. 4, 1888.
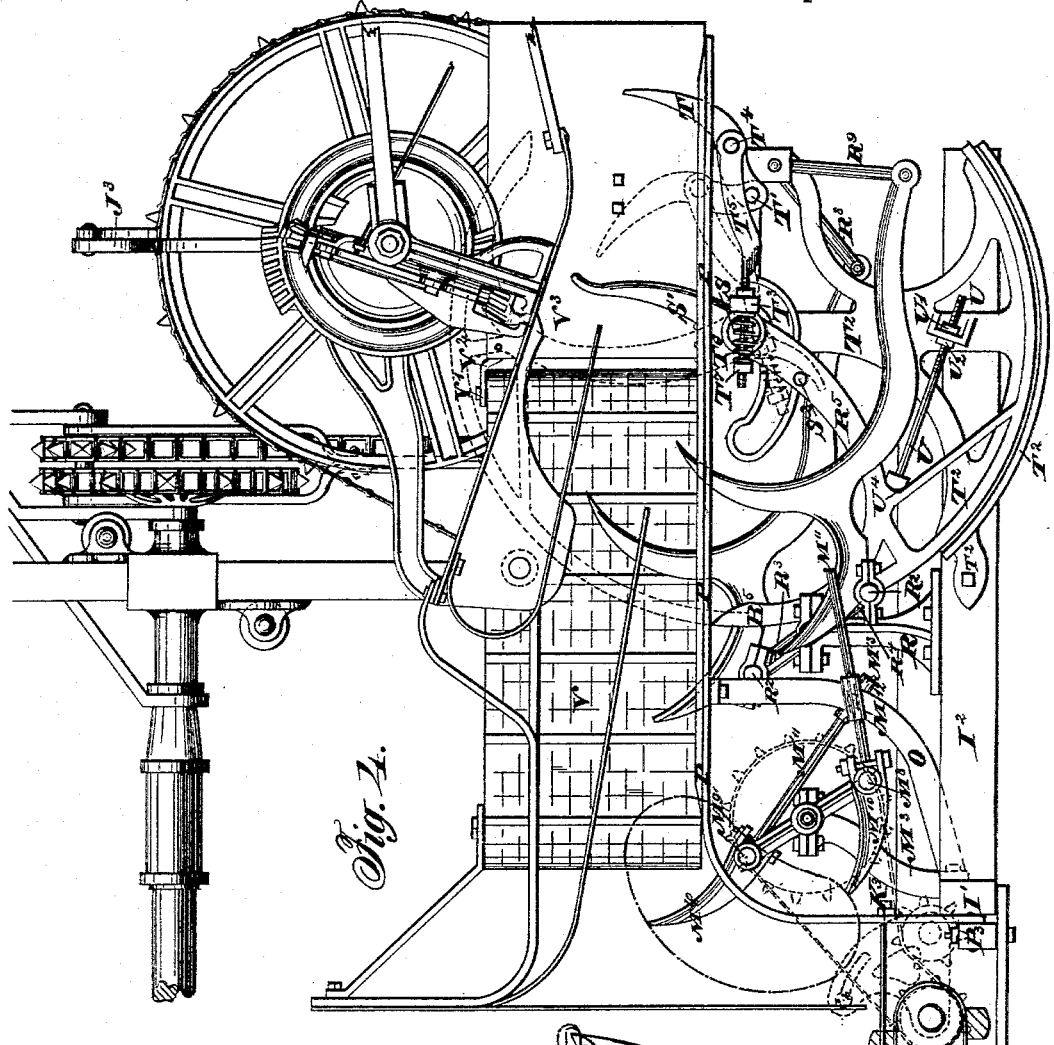
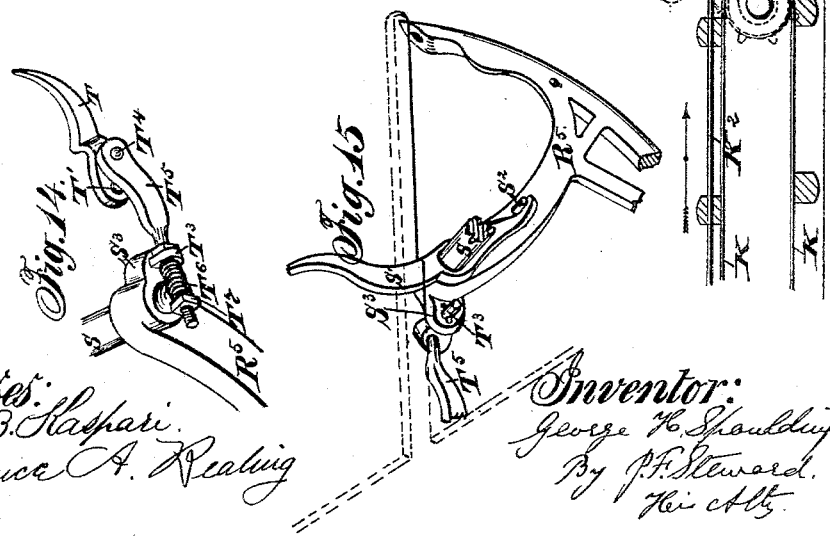

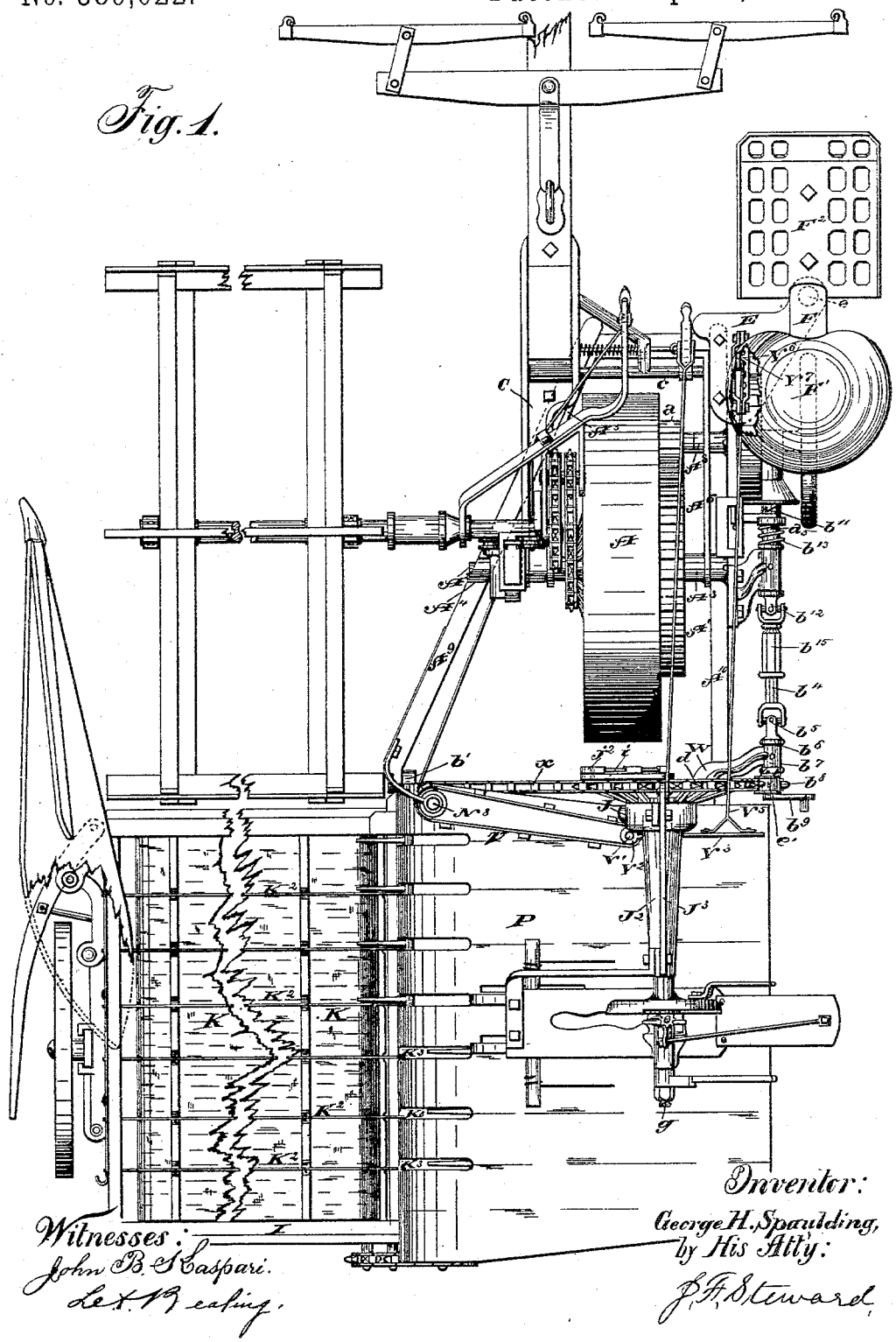

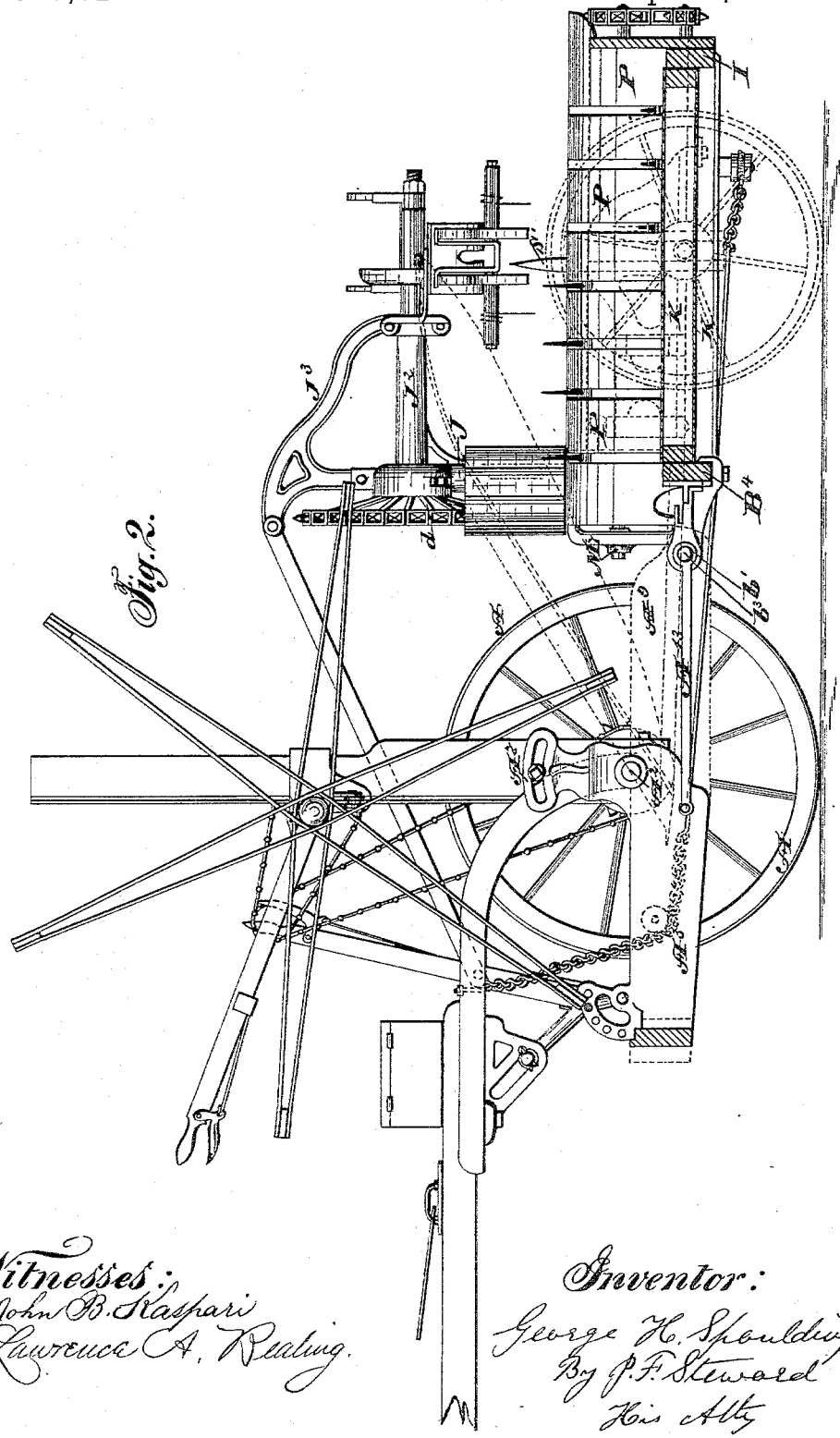

(No Model.) 7 Sheets—Sheet 5.

G. H. SPAULDING.
SELF BINDING HARVESTER.

No. 389,022. Patented Sept. 4, 1888.

Witnesses:
John B. Kaspari.
Laurence A. Dealing.

Inventor.
George H. Spaulding.
By J. F. Steward.
His Atty (No Model.) 7 Sheets—Sheet 6.
G. H. SPAULDING.
SELF BINDING HARVESTER.
No. 389,022. Patented Sept. 4, 1888.
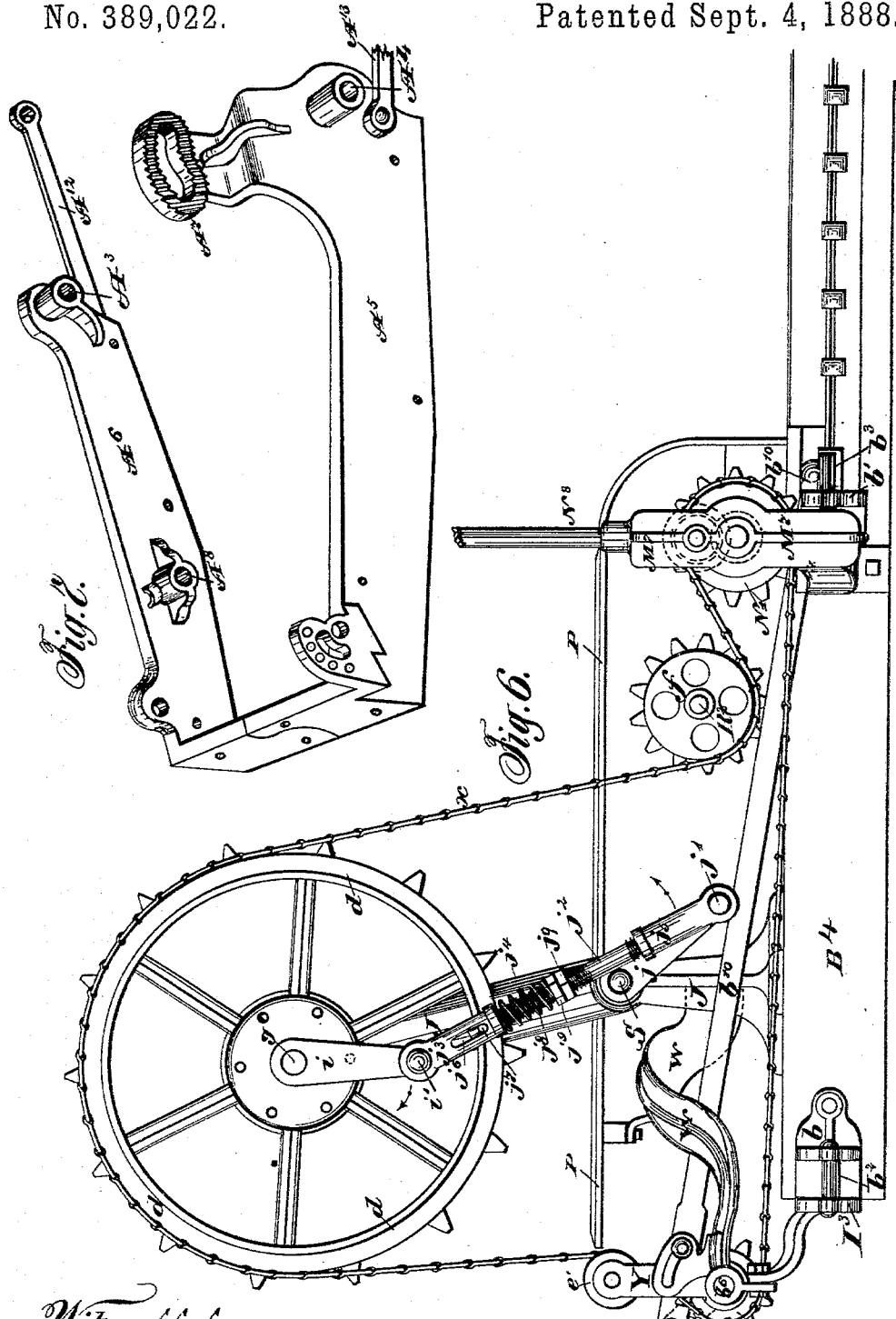

(No Model.) 7 Sheets—Sheet 7.

G. H. SPAULDING.
SELF BINDING HARVESTER.

No. 389,022. Patented Sept. 4, 1888.

Witnesses:
John B. Kaspari,
L. A. Bealing.

Inventor,
George H. Spaulding,
By His Att'y:
P. F. Steward.

N. PETERS, Photo-Lithographer, Washington, D. C.

UNITED STATES PATENT OFFICE.

GEORGE H. SPAULDING, OF CHICAGO, ILLINOIS, ASSIGNOR TO WILLIAM DEERING, OF SAME PLACE.

SELF-BINDING HARVESTER.

SPECIFICATION forming part of Letters Patent No. 389,022, dated September 4, 1888.

Application filed October 13, 1883. Serial No. 108,959. (No model.)

*To all whom it may concern:*

Be it known that I, GEORGE H. SPAULDING, of Chicago, in the county of Cook and State of Illinois, have invented certain new and useful Improvements in Self-Binding Harvesters, of which the following is a full description, reference being had to the accompanying drawings, in which—

Figure 8:
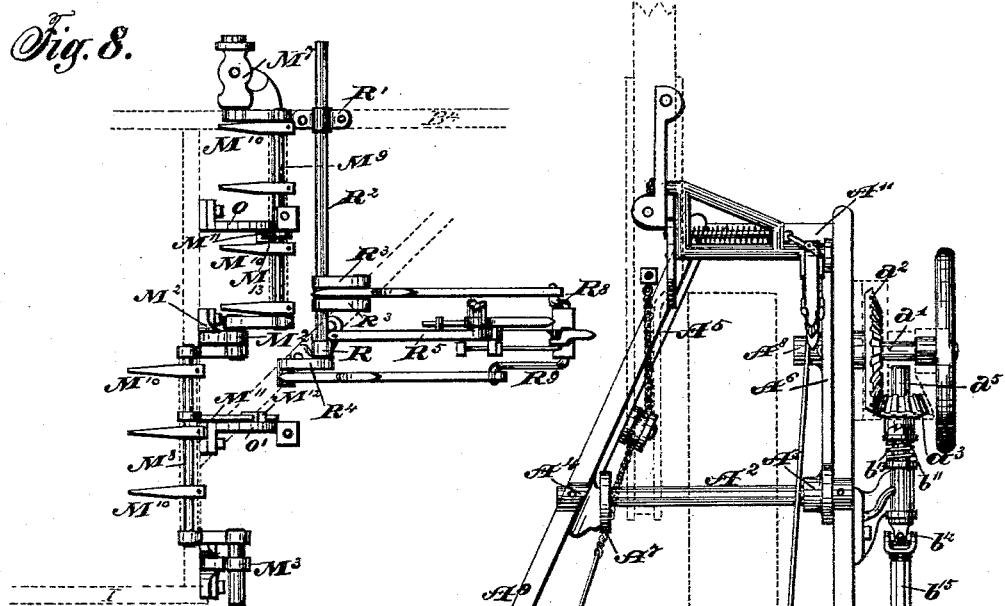
Figure 5:
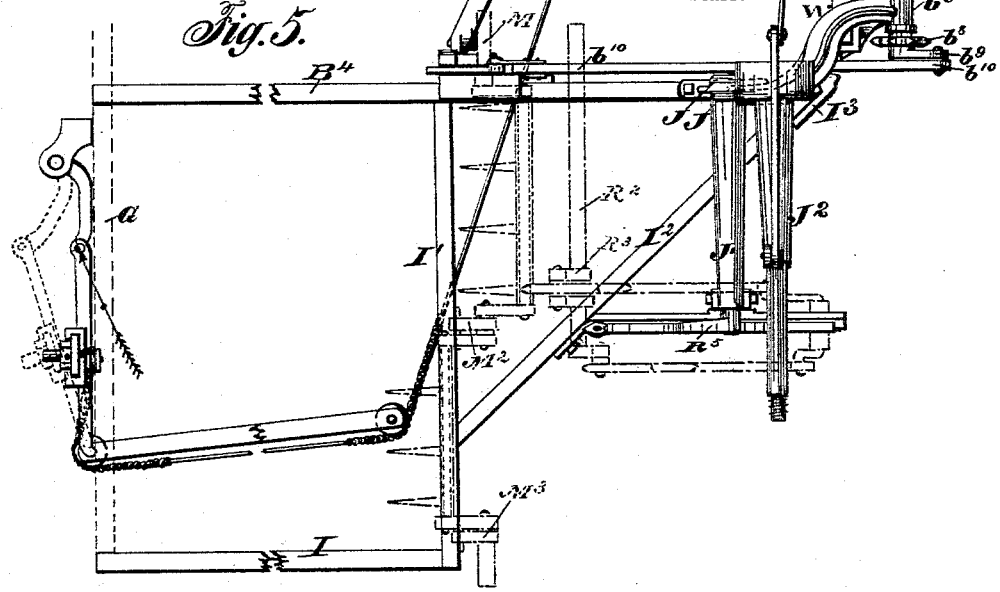
Figure 11:
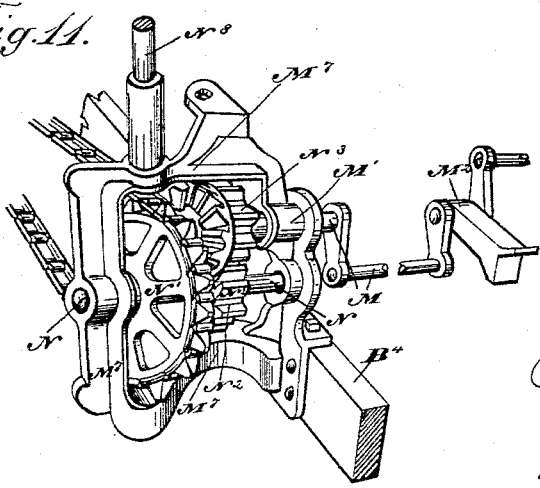
Figure 12:
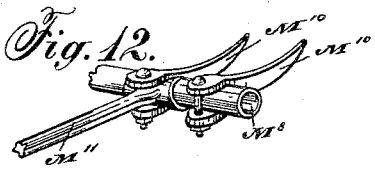
Figure 16:
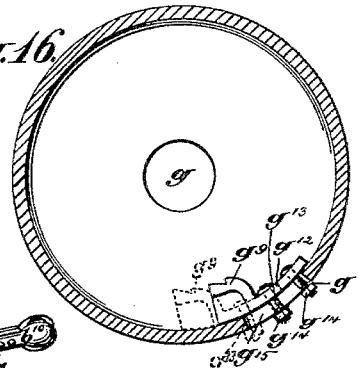
Figure 13:
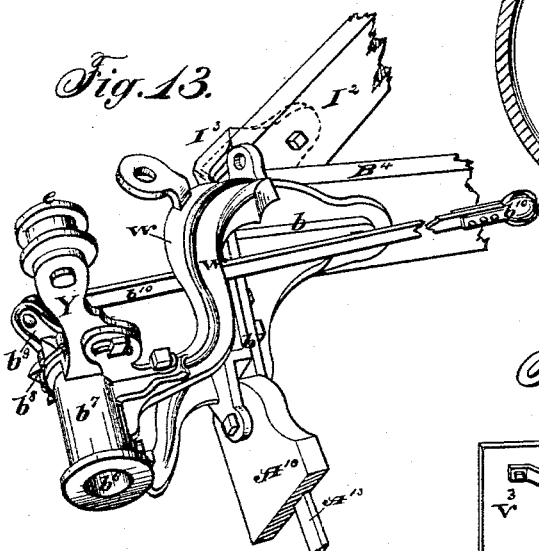
Figure 17:
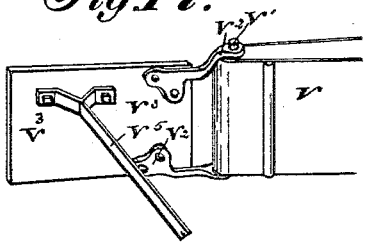

Figure 1 is a plan view showing certain parts broken away for clearness and others to shorten the figure. Fig. 2 is a grain-side view of the machine. Fig. 3 is a stubble-side view. Fig. 4 is a rear view of the machine as if cut on the line $xx$ of Fig. 1. Fig. 5 is a plan view designed to show the frame-work and certain details of construction, which will be fully pointed out. Fig. 6 is a front view of the grain-platform and binder-table, showing also the binder-driving and cutter-driving mechanism. Fig. 7 is a perspective view of the metallic part of the frame-work of the harvester. Fig. 8 is a plan view of the elevating and packing mechanism and the needle and compressor. Fig. 9 is a front view of the clutching-devices. Fig. 10 is a grain side view of the same. Fig. 11 is a perspective view of the gearing for driving the elevating and adjusting mechanism. Fig. 12 is a perspective detail view of the elevating-fingers. Fig. 13 is a perspective view of the bracket forming a support and bearing for the sickle-driving devices. Fig. 14 is a perspective view of the compressor-arm and its moving mechanism in detail. Fig. 15 is a perspective view of the needle and the tripping-arm. Fig. 16 is a detail of part of the clutching-device. Fig. 17 is a perspective view of the butt-board.

The object of my invention is to produce a harvesting-machine that shall cut the grain and bind it with little elevation; and its nature consists in the production of devices and combinations of devices and arrangements of parts for bringing about the result, as will be fully pointed out.

In the drawings, A is the main supporting-wheel; A', the driving-gear secured to its stubble side.

$A^2$ is the axle fixed in the sleeve-like eyes $A^3$ and $A^4$ of the metallic linings of the main frame.

$A^5$ and $A^6$ are the heavy metallic linings of that part of the main frame which is in front of the axle. This frame serves two purposes, that of strengthening the wooden frame which surrounds it and forming bearings and supports for other parts, and by its weight and position—that is, in front of a supposed line extending from the axle of one wheel to the other—serves as a counterpoise to all parts of the machine in rear of said line—namely, the binder and cutting apparatus.

$A^7$ is a bracket extending upward and provided with a curved slot concentric with the sleeve $A^4$, which bracket and sleeve $A^4$ serve as means for securing the reel-post to the main frame. The curved slot admits a bolt, which passes through the reel-post when the latter is moved and corrugations in the metal along the slot, and a correspondingly-corrugated washer permits the post to be locked wherever set.

$A^8$ is a bearing for the counter-shaft.

The relative positions of the parts $A^5$ and $A^6$ of the metallic lining are shown in Fig. 7. In Fig. 5 the part $A^5$ is shown beside and within the wooden sill $A^9$ of the frame and $A^6$ as beside and within the sill $A^{10}$. Connecting the sills at their front is the piece $A^{11}$. The wooden frame thus formed and the metallic lining are bolted together, and, as a whole, they form a substantial gearing and supporting frame. The axle, having its ends fixed in the sides of the frame, serves as means for preventing them from spreading. On the frame thus formed is mounted all of the motive gearing, consisting of the spur-pinion $a$, keyed to the counter-shaft $a'$, which revolves in the bearing $A^8$. $a^2$ is a bevel-pinion keyed to the same shaft $a'$, which meshes into the pinion $a^3$. A bearing (shown in dotted lines in Fig. 5) supports the front end of the shaft $a^5$ as well as the outer end of the counter $d'$. This bearing is formed into a hood that covers the bevel-pinions $a^2$ and $a^3$, as seen in Figs. 1 and 3. The shaft $a^5$ is provided with a clutch and spring, by means of which the bevel-pinion $a^3$ is locked thereto when desired to throw the machine into gear. I mount a balance-wheel, $a^3$, on the counter-shaft $a'$, to increase the momentum of the running parts.

Referring now to Fig. 6, $B^4$ is the front platform sill or finger-bar, having bolted rigidly to its front face, at its stubble end, the strong brackets $b$ and $b'$. These brackets are provided with pivotal pins $b^2$ and $b^3$. The sill $A^{10}$ is at its rear end pivoted to the bracket $b$, and the sill $A^9$ is pivoted to the bracket $b'$. To strengthen the sills at their pivotal ends, I provide the bars $A^{12}$ and $A^{13}$, let into a groove in the inner sides of the said sills, as shown in Fig. 13, (simply to get it out of the way,) and provide each with an eye that shall receive the pivotal pins in the brackets $b$ and $b'$. The platform and main frame thus connected are free to be moved in relation to each other.

Upon the front stubble-side corner of the main frame is mounted the bracket E, having a socket, $e$, into which fits a boss projecting from beneath the foot of the seat-support F.

F' is the seat, placed in front of the axle, so that the weight of the attendant may contribute to act as a counterpoise to that of the platform and binder. This position is one of convenience to the various levers.

$F^2$ is a foot-platform bolted to a lug on the seat-support F.

The construction of the frame-work of the platform is shown in Fig. 5, where $B^4$ is the front platform-sill, upon the front face of which the usual cutting apparatus is placed. I is rearmost platform sill. The two sills are connected by the outside divider-board, G, and by the inner bar, I'. $I^2$ is a brace reaching from near the rear end of the bar I' to the stubble end of the front platform-sill, $B^4$, where the two are united by being bolted to the casting $I^3$. The usual bottom boards are secured beneath the sills $B^4$ and I.

The binder-frame consists of a footed standard, J, mounted upon the front platform-sill, $B^4$, in the position shown in Figs. 3 and 6, hollow, to give lightness and strength, and is provided with the sleeve J', for supporting and forming bearings for the needle shaft, and the sleeve $J^2$, forming a support and bearings for the knotter-shaft. These sleeves or arms J' $J^2$ overreach and underreach the passage-way, and the shafts therein supported carry the band carrying and knotting mechanism in such a position in relation to the length of long straw that the band will be as nearly central as may be desired.

K is the conveying-canvas on which the cut grain falls, and by which it is carried to the delivery end of the platform. In order to prevent the canvas from clogging by drawing straw down at the delivery end, as sometimes happens in like devices as used on many machines, I stretch the wires $K^2$ across the platform longitudinally close above the canvas and notch the slats, so that the greater part of their thickness shall project above the wires, connecting the ends of said wires to the outside divider-board and on the inner side at $K^3$ to the grain-table. By this arrangement any grain delivered by the canvas is supported until taken away by the elevating mechanism. (Shown in Figs. 8, 11, and 12.)

M, Fig. 11, is a cranked shaft supported in the bearings M' at the front $M^2$, at or near the middle, and $M^3$ in the rear. The last two bearings are in brackets upreaching from the inner platform-sill, I'. (See Fig. 4.) The bearing M' is formed in the frame $M^7$, which is bolted, as shown in Fig. 11, to the front platform-sill, $B^4$. The cranked shaft has but two wrists, each wrist upon the opposite side of the shaft from the other; but between the two wrists it has a short straight portion, which is borne in the bearing $M^2$.

M is a shaft having bearings in the frame $M^7$, and carrying the sprocket-wheel N', by which it is driven.

$M^5$ is a spur-gear keyed to the shaft, which gear meshes into the spur-gear $M^6$ on the shaft M, and thus the latter is driven.

Upon the long wrists of the shaft M are the gas-pipe sleeves $M^8$ and $M^9$, in which the said wrists freely revolve. Clamped to each gas-pipe are three teeth, $M^{10}$, the middle one of each series bolted to a guide-rod or stem, $M^{11}$.

O and O' are brackets bolted to the sill I', and which reach inward and upward and support the binder-table. They also support the the rocking guide-sleeves $M^{12}$ and $M^{13}$, through which the guide-stems slide as the crank-shaft is revolved, and thus the teeth are prevented from rotating, and are simply carried with the cranks. The path of movement of the points of the teeth is substantially that shown in broken lines in Fig. 4.

P is the binding-table, substantially horizontal, but so much higher than the platform-canvas that the crank-shaft M may revolve wholly beneath it. The table I construct of thin boards and provide its surface, as well as the curved breast, with slots, through which the elevating-teeth reach and through which the packers and needle operate. The vertical part forms a breast, against which the grain is delivered and straightened and where it is engaged by the elevating devices. I secure the table to the platform by bolting it to the bar $P^3$, (see Fig. 4,) its stubble end being supported by resting on the lowermost sleeve of the binder-standard, and provide other suitable supports, which need not be pointed out.

Upon the bar $I^2$ of the platform-frame I mount the bracket R, and upon the sill $B^4$, I place the bracket R'. (See Fig. 8.) These reach upward and form bearings for the packer-shaft $R^2$, having the cranks $R^3$ and $R^4$ located upon either side of the needle $R^5$. The cranks are so located upon the shaft as to give the packers which they carry alternate action upon the grain. The packers are controlled by being linked to the frame-work in the usual manner by the links $R^8$ and $R^9$.

The needle is of a well-known form, differing from many in use only in the details of construction shown in Figs. 14 and 15, where S is the needle-shaft, on which is placed the trip-arm S', having a short arm extending from the hub in an opposite direction so far as to reach the stop-pin $S^2$ on the needle. As the grain is moved into the receptacle and compacted against this arm, the needle-shaft is rocked and the clutch permitted to engage, as will be explained. Only while the needle is retracted is the arm in position to act as a trip, as when the needle is moved upward the arm may fall away and remain at rest beneath the table, its end resting on the cleats of the table. Upon the return of the needle the pin $S^2$ engages the trip-arm and erects it to its position for receiving the gavel.

T is the compressor-arm, pivoted at T' to the needle-shield, $T^2$.

$S^3$ is a heel on the needle, in which is the eyebolt $T^3$. Passing through the eye in the head of the bolt and reaching and pivoted to the compressor at $T^4$ is the connecting-arm $T^5$.

$T^6$ is a spring surrounding the stem of the connecting arm.

$T^7$ is a nut, by which the tension of the spring may be increased or decreased at will. When the needle is moved upward in a direction to perform its office, the compressor, being connected eccentrically to the said needle's axis, is drawn up to meet the gavel in opposition to the needle and that elastically. As the needle retracts, the compressor is made to fall and permit the discharge of the bundle.

The needle-shield is bolted to the platform-frame and to the lowermost sleeve of the binder-frame, and thus serves in part as a support for the latter. The shield is strongly made and serves as a protection to prevent the needle from being bent or broken by coming in contact with stumps or stones.

The holding and knotting devices are of a form in common use and need not be described.

U is a bolt screwed into a seat in the needle-shield, and its head adapted to form a stop for the needle by engaging it at $U^4$ and preventing the latter from falling too low. The bolt being threaded it may be adjusted and by the check-nuts U' and $U^2$ held in place.

$U^3$ is the adjuster-canvas shaft projecting upward from the frame M' and through the table and which carries the adjuster-canvas drum. The adjuster-canvas frame vibrates around the shaft as an axis and sweeps over the upper surface of the table close thereto. The adjuster-frame carries a small roller at its free end, around which and the driving-drum the slotted canvas V is drawn, these parts being of ordinary and well known construction. The journals V' of this roll are projected through and beyond their frame and serve as journals for plates $V^2$, fastened to a board, $V^3$, which projects beyond the apron, as shown in Figs. 1, 4, and 17, forming in effect a continuation thereof to prevent the accumulating grain, which has been adjusted by the apron, from sliding forward on the machine.

Riveted to the front face of the board are the ends of a forked rod, $V^5$, which rod extends forward to the lever $V^6$, which is provided with means for locking it to the sector $V^7$. By this means the adjuster is moved to any required position and by it retained, and the board at the same time kept substantially parallel with the sides of the table.

$b^{11}$ is a clutch which engages with its fellow on the pinion $a^3$.

$b^{13}$ is the clutch-spring.

$b^{12}$ is a universal joint connecting the rear end of the short shaft $a^5$ to the hollow shaft $b^{15}$.

$b^4$ is a squared shaft fitting into the hollow shaft $b^{15}$, and so loose as to slide therein.

$b^5$ is a universal joint, by which the shaft $b^4$ is connected to the short shaft $b^6$, which shaft revolves in the bearing $b^7$ on the bracket W.

$b^8$ is a sprocket-wheel keyed to the shaft, by which the delivery and binding mechanism is driven.

$b^9$ is a crank, by which the cutting apparatus is moved.

$b^{10}$ is the pitman, parallel with and in front of the binder-frame, as seen in Fig. 6.

Referring to Figs. 2 and 3, the relative positions of the gearing-frame and platform will be seen at different adjustments. The slip-shafts and universal joint permit this change and still drive all of the parts.

$d$ is a sprocket-wheel mounted loosely on the knotter-driving shaft. $f$ is a sprocket-wheel keyed on the packer-shaft $R^2$. These wheels are all on the same plane as the sprocket-wheels $b^8$ and N', and around all, but under $f$, I throw the chain X, as seen in Fig. 6.

I mount an arm, Y, having an eye onto the rear end of the bearing $b^7$, and bolt it to a wing thrown upward on the said bearing having a slot, so that the bolt may move with the arm as the latter is adjusted. By means of the bolt when drawn up, the arm is retained in any position. Upon a suitable stud on this arm I place the tightening-wheel $e'$, by which all slack of the chain is taken up. The chain being driven by the continuously-driven crank-shaft gives continuous motion to the delivery and packing mechanism; but I provide automatic clutching mechanism that shall intermittently connect the binding mechanism with the motive power.

At the junction of the tubular arm or sleeve $J^2$ with the standard J, I enlarge the former, as seen in Figs. 3, 9, and 10. The arm or sleeve $J^2$ is reduced near each end, so as to form bearings for the knotter-shaft, and the enlargement before mentioned is hollowed out to make room for the clutching devices.

Upon the knotter-shaft $g$, outside of the bearings, but within the hollow of the enlargement, I rigidly secure the arm $g'$, and pivot to it by means of a pin at $g^2$ the pawl $g^3$ at $g^4$.

At $g^5$, I connect a spring, $g^6$, to the arm $g'$, and extend it and connect it to the pawl $g^3$ at $g^{11}$. The spring serves to throw the pawl outward, so that it may be in the position for engagement of the rollers $h$, mounted on the pins $h'$ on the hub of the sprocket-wheel $d$, and projecting into the hollow enlargement.

To the inner surface of the shell of the enlargement at $g^{12}$, I bolt the cam $g^9$ adjustably by means of bolts $g^{13}$, which pass through slots in the wall and take the nuts $g^{14}$. The slots $g^{15}$ permit the cam to be moved from the position shown in full lines to that shown in dotted lines in Fig. 16, and vice versa, or to any position between these two points. As the wheel $d$ revolves, one of the rollers $h$ engages the recesses $g^7$ of the pawl $g^3$, and thus carries the pawl, and hence the shaft $g$, forward in its rotation until it reaches the portion $g^8$, where it strikes the stationary cam $g^9$ and is forced to rock on its pivot until it is forced out of engagement with the roller $h$, and then the wheel $d$ is permitted to revolve without carrying the shaft. If, now, the shaft $g$ is made to revolve slightly in its forward direction, the pawl $g^3$ will be drawn off from the cam $g^9$, and the spring $g^6$ will throw it out so far as to reach the path of the rollers $h$, and the clutching be completed, and the wheel $d$ will carry the shaft $g$ until relieved from so doing by the pawl being forced away by the cam. This slight forward movement of the knotter-driving shaft does not derange the knotting mechanism, because the knotting devices are operated but during a small part of a rotation of the shaft, and that part of a revolution is at a different part of the movement of the said shaft. As this feature is well understood in the art, no description is necessary.

Outside of—that is, in front of—the wheel $d$, on the shaft $g$, I secure the crank $i$, having the wrist-pin $i'$. To the forward end of the needle-shaft I secure the crank $j$, having the wrist-pin $j'$. Connecting the two wrist-pins is the pitman $j^2$, composed of the head $j^3$, taking onto the wrist-pin $i'$ and socketed to receive the end of the rod $j^4$, and slotted at $j^6$ to receive the pin $j^7$, which passes through the end of the rod $j^4$. $j^5$ is a head taking onto the wrist $j'$.

$j^8$ is a coiled spring surrounding the pitman, and $j^9$ represents nuts threaded onto the rod. The slot-and-pin connection permits the pitman to be shortened to a limited extent while the crank $i$ is passing the center. After so passing, the spring compels the rod to assume its original length. The purpose of this is to prevent the clutching device from clattering after disengagement—a fault inherent in all automatic clutches.

The position of the cam $g^9$ is such that the pawl $g^3$ is forced upward so far as to permit the rollers $h$ to escape from the seat or recess $g^7$ just after the instant the crank $i$ has passed its lowermost center. The needle-shaft being estopped from further downward movement, the pitman must shorten to permit the crank to pass the center. The effort of the spring to elongate the pitman will move the crank forward a small distance farther, and this will cause the pawl to draw so far upward on the cam as to move it so far away from the path of the rollers $h$ that they shall not strike it as they pass. The pressure of the accumulating gavel on the trip-arm rocks the needle, as already explained, and hence its shaft and crank and the pitman are moved upward and the knotter-shaft moved forward, and by such movement the pawl is drawn entirely off from the cam, and, being thrown out by its spring, engages one of the rollers $h$, and the binder is then carried through an entire revolution by the motive power. The adjustment of the cam determines the distance the knotter-shaft shall be turned before engagement, and hence the distance the tripping-arm shall be moved before the binder will be started, and hence the size of the gavel produced.

In order that the needle, coming so near to the ground as it does, shall not be broken by striking obstructions I provide a shield, (shown in Figs. 4 and 5,) which is secured to the bar $I^2$.

I am aware that a swinging butt-adjuster has been combined with a board hinged to its ends and an adjusting rod connected with said board; but I believe myself to be the first to attach the adjusting-rod rigidly to the board and to provide means for guiding or holding the rod in such manner that it serves alone as a means of moving both the adjuster and the board and of maintaining the latter at all times in a position parallel to the side of the table. In all other machines of which I am aware it is necessary to provide additional parts for this purpose.

It will be observed that in my machine the vertically-slotted face rising from the platform serves as means of straightening the grain—that is to say, of placing it at right angles to the cutter-bar. Although the grain may fall in an oblique position upon the platform, it is carried by the platform-conveyers sharply against this upright face, which serves to momentarily arrest the heads while the butts are advancing, so that when the grain is lifted to the table above, it will lie thereon in proper condition to be bound.

What I claim is—

1. The series of rollers $h$, mounted on the continuously-revolving wheel, and the pawl adapted to engage them pivoted to the arm $g'$, keyed to the intermittingly-revolving shaft $g$, and having the heel $g^8$, combined with the adjustable cam $g^9$, substantially as described.

2. The clutching device consisting of the spring-pawl and the series of rollers $h$, the cam $g^9$, and means whereby the pawl of said clutching device is drawn off from the cam by forward movement of the shaft to which it is keyed, and the clutching devices permitted to engage, all combined substantially as described.

3. The clutching device consisting of the spring-pawl and series of rollers $h$, combined with the cam $g^9$ and the needle-shaft adapted to be rocked by the pressure of the accumulating gavel, and suitable connecting mechanism, whereby the said movement of the needle-shaft is adapted to move the heel of the pawl from the cam, and thus permit engagement of the said clutching device, substantially as described.

4. The clutching device consisting of the spring-pawl and the series of rollers $h$, the cam $g^9$, the needle-shaft adapted to be rocked by the pressure of the accumulating gavel, suitable connecting mechanism, whereby the said movement of the needle-shaft is adapted to move the knotter-shaft in a forward direction and by such movement draw the pawl from the cam, and thus trip the said clutching mechanism, all combined and arranged substantially as described.

5. The shaft $g$, having crank $i$, in combination with the clutching mechanism, the needle-shaft adapted to be rocked on its axis by pressure of the accumulating gavel and having the crank $j$, and suitable mechanism connecting said cranks, whereby the rocking of the needle-shaft will rock the shaft $g$ and trip the clutch, substantially as described.

6. The grain-adjusting mechanism adapted to be swung horizontally on its pivot, the board $V^3$, hinged to the adjuster-frame, and the rod $V^5$, secured rigidly to said board and extending thence forward, and means, as the hand-lever, for guiding the forward end of the rod in a line substantially parallel with the line of travel, whereby the rod is enabled to move the grain-adjuster and the board, and also to hold the latter at all times substantially parallel with the side of the grain-table.

GEO. H. SPAULDING.

Witnesses:
J. F. STEWARD,
JOHN FAXON.